United States Patent [19]

Caufman

[11] Patent Number: 5,082,205
[45] Date of Patent: Jan. 21, 1992

[54] SEMI-BUOYANT COMPOSITE AIRCRAFT WITH NON-ROTATING AEROSTAT

[76] Inventor: Robert L. Caufman, 205 S. Maryland Ave., Wilmington, Del. 19804

[21] Appl. No.: 564,645

[22] Filed: Aug. 9, 1990

[51] Int. Cl.[5] .......................... B64B 1/34; B64C 37/02
[52] U.S. Cl. .................................. 244/025; 244/026; 244/002; 416/113
[58] Field of Search ..................... 244/2, 5, 6, 7 A, 9, 244/24, 25, 26, 27-30, 31, 17.11, 67, 97; 290/55; 416/99, 111, 113, 114, 156, 98

[56] References Cited

U.S. PATENT DOCUMENTS

| | | | |
|---|---|---|---|
| 1,419,962 | 6/1922 | Denham | 416/99 |
| 1,750,765 | 3/1930 | Silver | 244/67 |
| 3,976,265 | 8/1976 | Doolittle | 244/26 X |
| 4,450,364 | 5/1984 | Benoit | 244/25 X |
| 4,482,110 | 11/1984 | Crimmins, Jr. | 244/26 |
| 4,695,012 | 9/1987 | Lindenbaum | 244/26 |

*Primary Examiner*—Joseph F. Peters, Jr.
*Assistant Examiner*—Carla Mattix
*Attorney, Agent, or Firm*—Charles S. Knothe

[57] ABSTRACT

A hybrid aircraft with a large non-rotating balloon chamber containing a lighter-than-air gas which provides a large static lifting force having a magnitude substantially greater than the weight of the aircraft with a support structure system which is substantially longer in length than in width which is encased by the balloon chamber the support structure system having two ends which protrude from the balloon chamber at opposite sides along the center line of the balloon chamber with a rotatable rotor frame suspended from the ends of the support structure system about the non-rotating balloon chamber. The craft has a plurality of blade airfoils connected to the rotor frame and oriented radially relative to the balloon chamber and which the angle of attack of each blade can be varied. A thrust means is mounted at or near the outboard end of the blade airfoils. Wing airfoil perpendicularly connected to the end of the blade airfoil at the same end as the thrust means and which the angle of attack of each blade can be varied. The craft has cab, load line and a means of anti-torque as required.

4 Claims, 7 Drawing Sheets

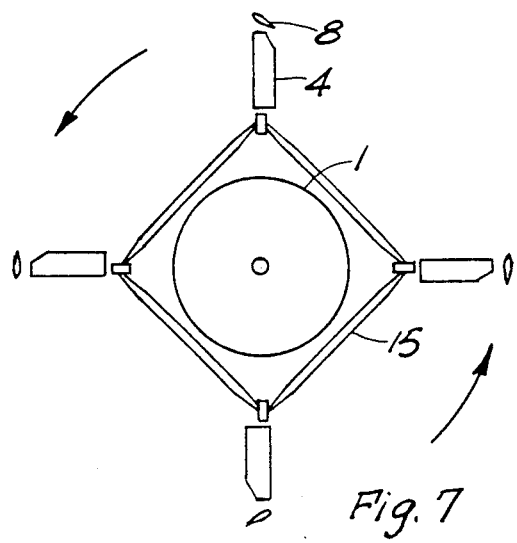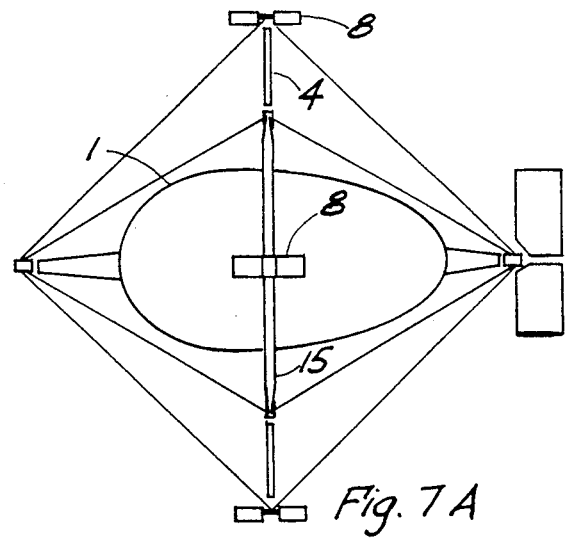
Fig. 7    Fig. 7A
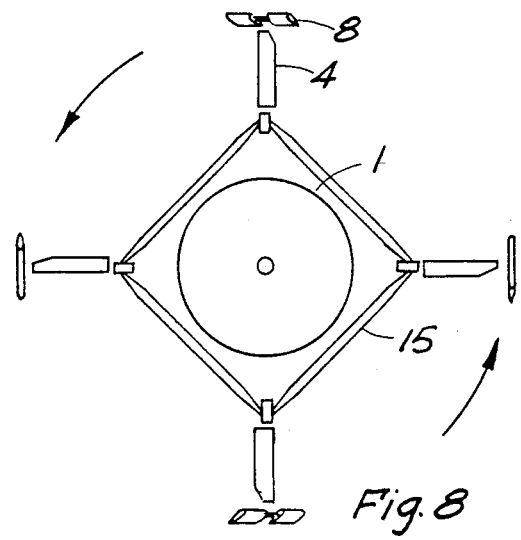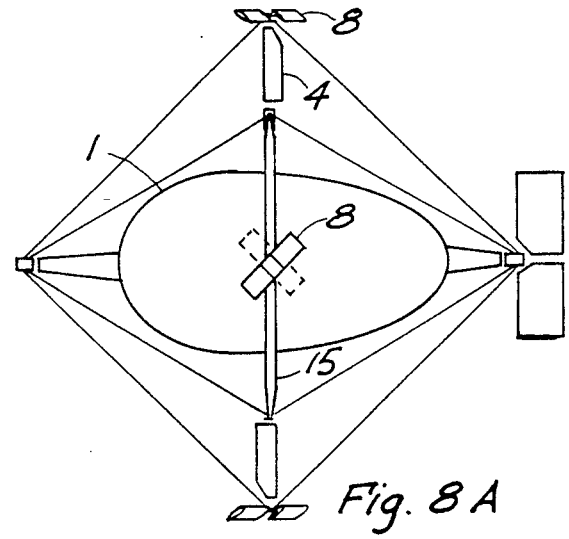
Fig. 8    Fig. 8A
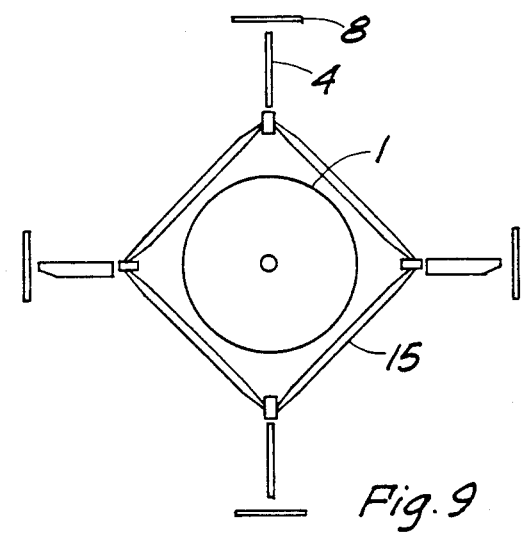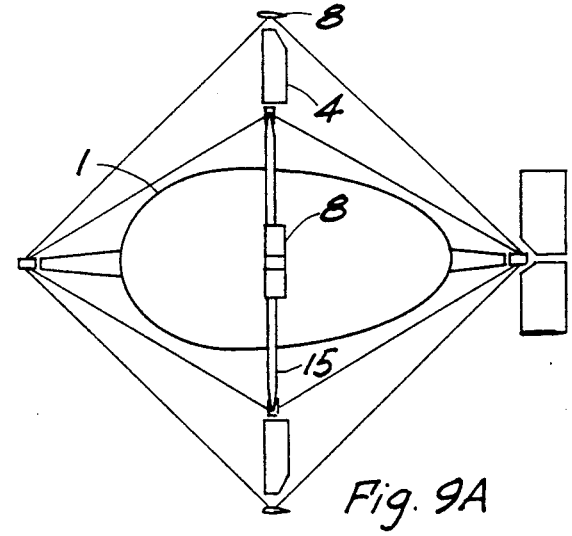
Fig. 9    Fig. 9A

SEMI-BUOYANT COMPOSITE AIRCRAFT WITH NON-ROTATING AEROSTAT

BACKGROUND OF INVENTION

The purpose of this invention is to provide an aircraft that is capable of ulta-heavy lifting at a slow speed for extended periods of time without refueling. This craft provides both aerostatic and aerodynamic lift. This type of craft is useful in both the logging and construction industries.

A further purpose of this invention is to provide a semi-buoyant composite aircraft with a non-rotating aerostat. Previous composite aircraft with a balloon rotating about a vertical axis suffer from the magnus effect due to the rotation. Also, this invention eliminates the difficult structural problems associated with the rotating ballonet. This aircraft can have either a vertical or horizontal axis.

BRIEF DESCRIPTION OF THE DRAWING

FIGS. 7, 8, and 9 are front elevations of the aircraft with horizontal axis showing the various positions of the blades and wings in flight.

FIGS. 7a, 8a, and 9a are side elevations of the aircraft with a horizontal axis showing the various positions of the blades and wings shown in FIGS. 7, 8, and 9.

SUMMARY OF INVENTION

This invention discloses a hybrid aircraft with a large non-rotating balloon chamber containing a lighter-than-air gas which provides a large static lifting force having a magnitude substantially greater than the weight of said aircraft. A support structure system which is substantially longer in length than in width is encased by the balloon chamber. The support structure system has two ends which protrude from the balloon chamber at opposite sides along the center line of the balloon chamber. A rotatable rotor frame is suspended from the ends of the support structure system about the non-rotating balloon chamber.

Blade airfoils are connected to the rotor frame and are oriented radially relative to the axis. The angle of attack of these blade airfoils can be varied. A thrust means is mounted at or near the outboard end of the blade airfoils. Wing airfoils are perpendicularly connected to the end of the blade airfoil at the same end as the thrust means. The angle of attack of these wing airfoils can also be varied. The craft contains an anti-torque device to keep the craft stable, a cab and load line.

DETAILED DESCRIPTION OF THE DRAWINGS

Figure 1:
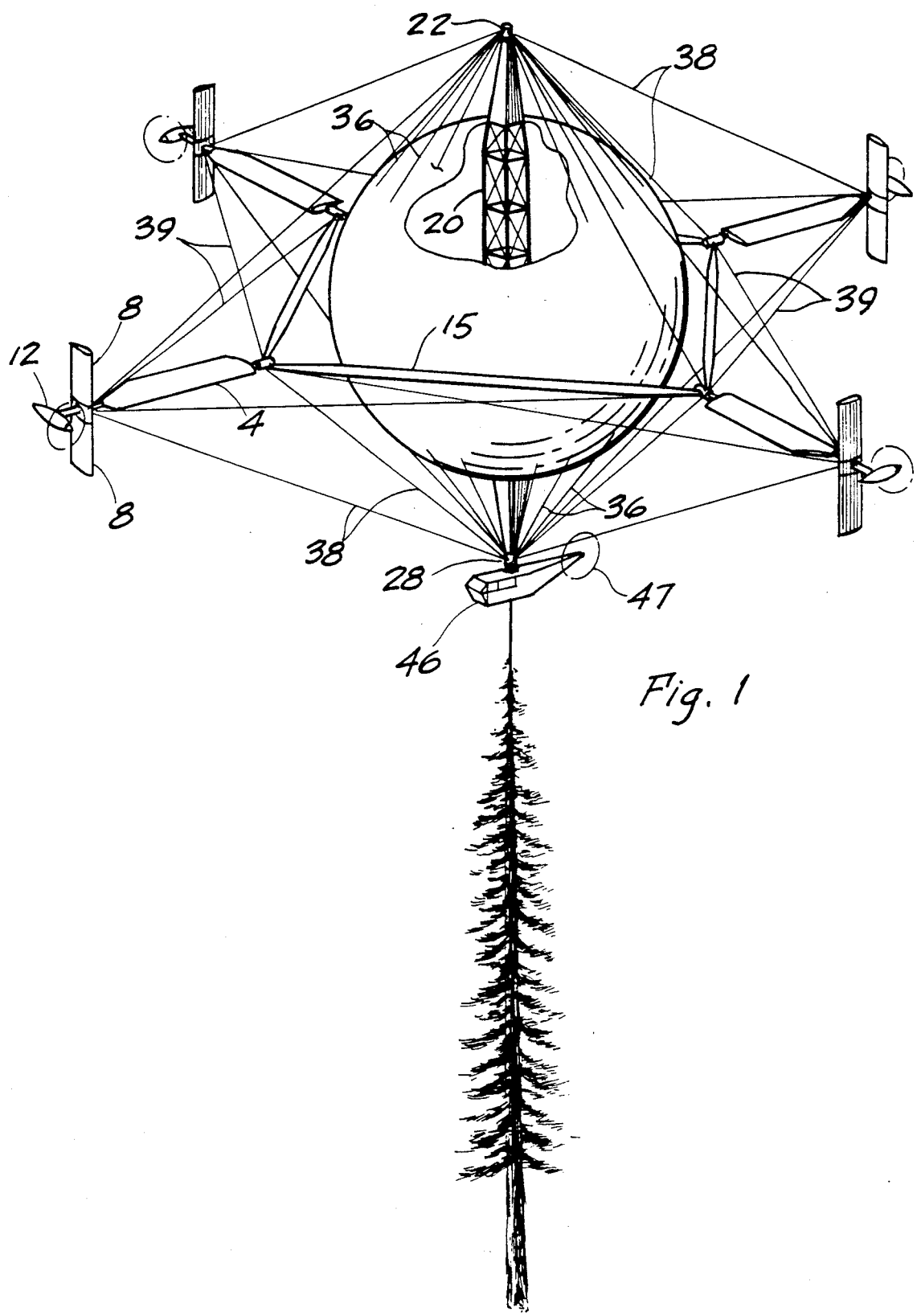
FIG. 1 is a pictorial view of the aircraft with a vertical axis, partially broken away with the aircraft lifting an entire tree from a forest.

In FIG. 1 the support structure 20 is oriented vertically and is encased by the balloon chamber 1. The rotor frame 15 is positioned by the suspension cables 38 which are connected to the support structure 20 at top terminal 22 and the lower terminal 28. The hull attachment cables 36 position the balloon chamber 1 within the rotor frame 15. A plurality of blade airfoils 4 are connected to the rotor frame. At the end of each blade airfoil 4 are vertical wing airfoils 8 and a thrust means 12. The thrust means causes the rotor frame 15 to rotate around the stationary balloon chamber 1. The thrust means can be a conventional internal combustion engine with a propeller though it is not limited to this means as other means would work effectively also. Peripheral cables 39 hold the blade airfoils 4 in the proper position. The control cab 46 is suspended from the lower terminal 28. The anti-torque device 47 is attached to the control cab. In the embodiment shown in FIG. 1 the anti-torque devise is a propeller but those devices are available to one skilled in the science.

Figure 2:
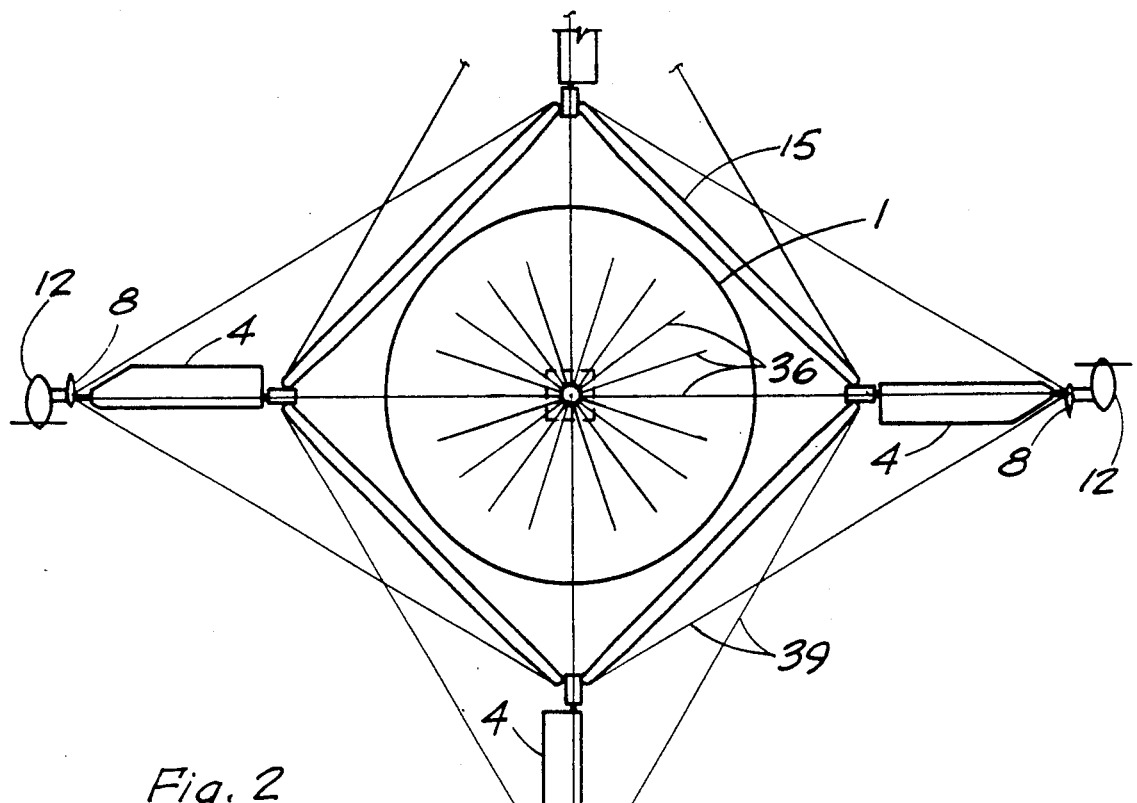
FIG. 2 is a top plan view of the aircraft with a vertical axis.

FIG. 2 is a top plan view and shows the balloon chamber 1 enclosed by the rotor frame 15. The balloon chamber 1 is positioned by the hull attachment cables 36. The blade airfoils are connected to the rotator frame. The angle of attack of the blade airfoils can be adjusted collectively and cyclicly to creating no lift, positive lift or negative lift.

Figure 2A:
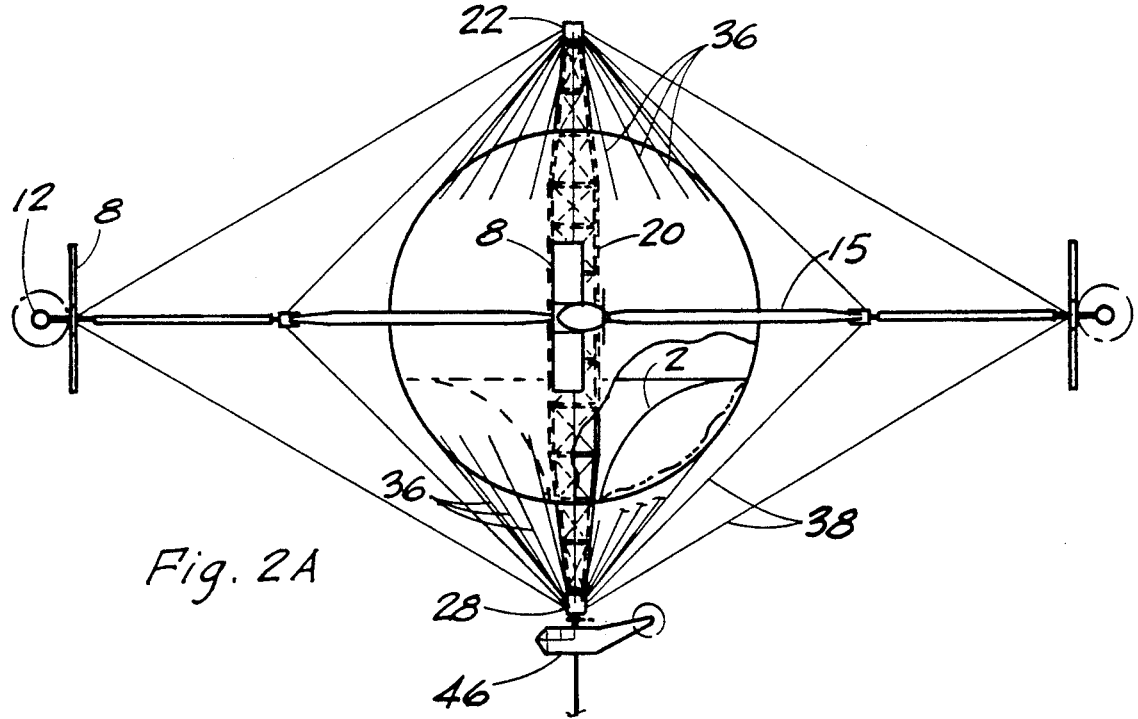
FIG. 2A is a side view of the aircraft with a vertical axis.

FIG. 2A is a side view of the aircraft with a vertical axis. The balloon chamber 1 extends above and below the rotor frame 15. The balloon chamber is positioned by the hull attachment cables 36 and the peripheral cables 38 position the airfoils 4 in the proper position.

Figure 3:
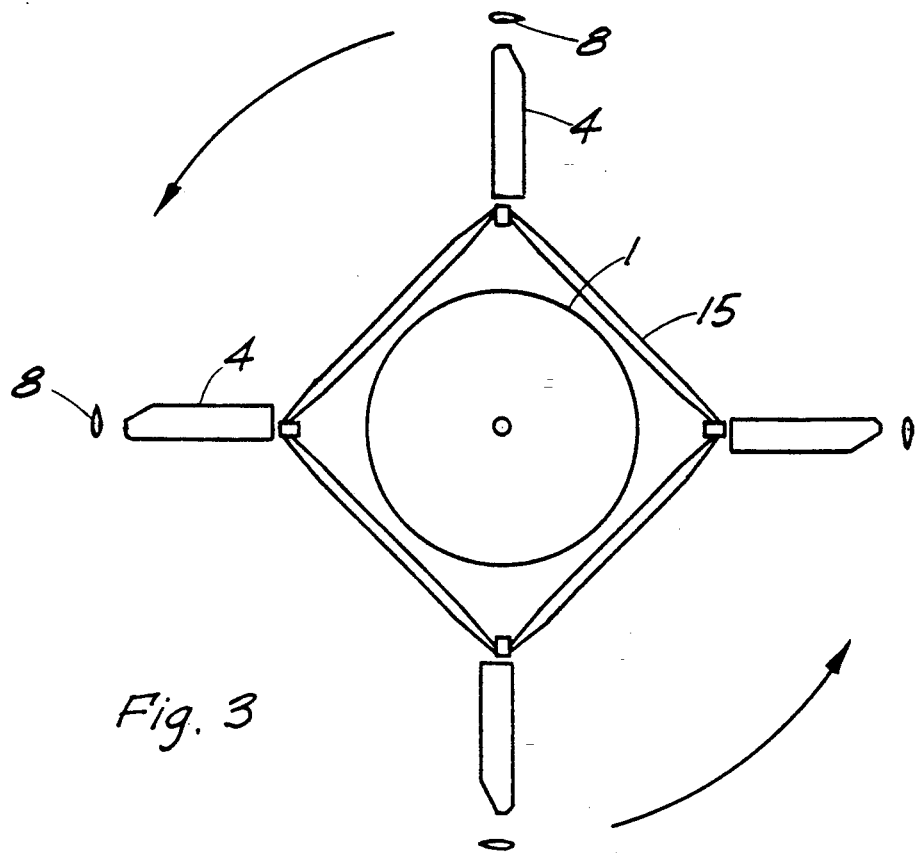
FIG. 3 is a schematic top plan view of the aircraft with a vertical axis showing the angle of attack of the vertical wings in trail, or neutral pitch, when the aircraft is in hover or vertical flight.
Figure 3A:
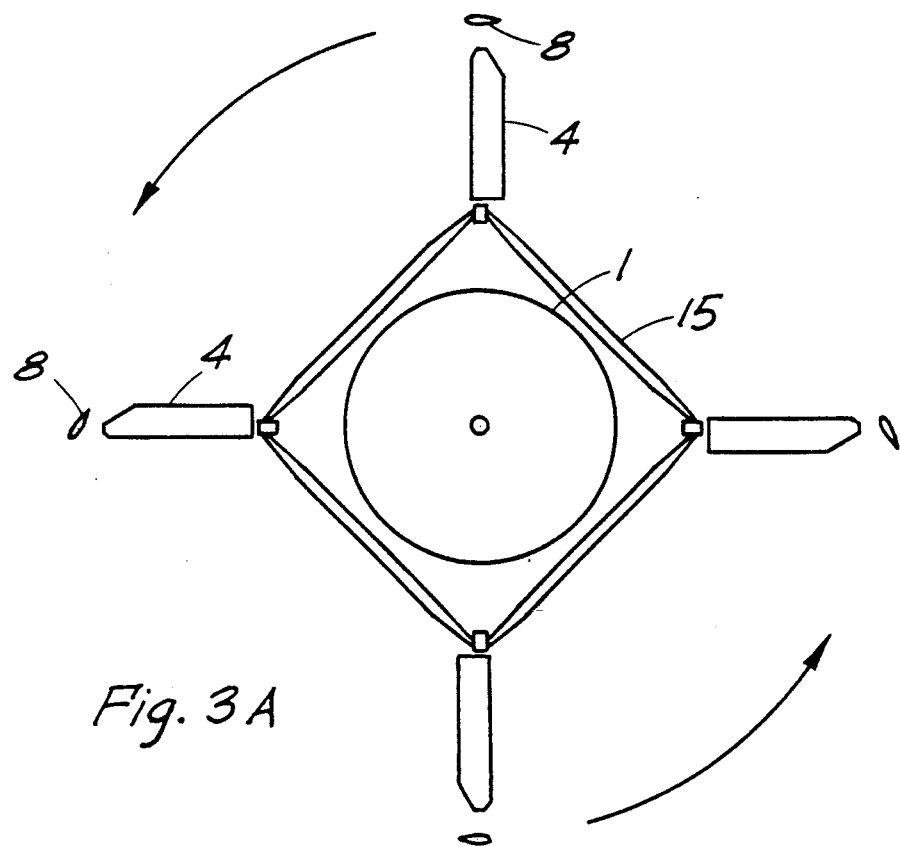
FIG. 3a is a schematic top plan view of the aircraft with a vertical axis showing the angle of attack of the vertical wings in cyclic pitch when the aircraft is in horizontal flight.

FIG. 3 shows the angle of attack of the vertical wings 8 in trail or neutral pitch, when the aircraft is in hover or vertical flight. FIG. 3A shows the angle of attack at four points of the vertical wings 8 in cyclic pitch when the aircraft is in horizontal flight. In these figures the curved arrows show the direction of the rotation of the rotor frame 15 and the arrow in FIG. 3a shows the direction of motion of the aircraft based on the cyclic pitch of the vertical wings 8.

Figure 10:
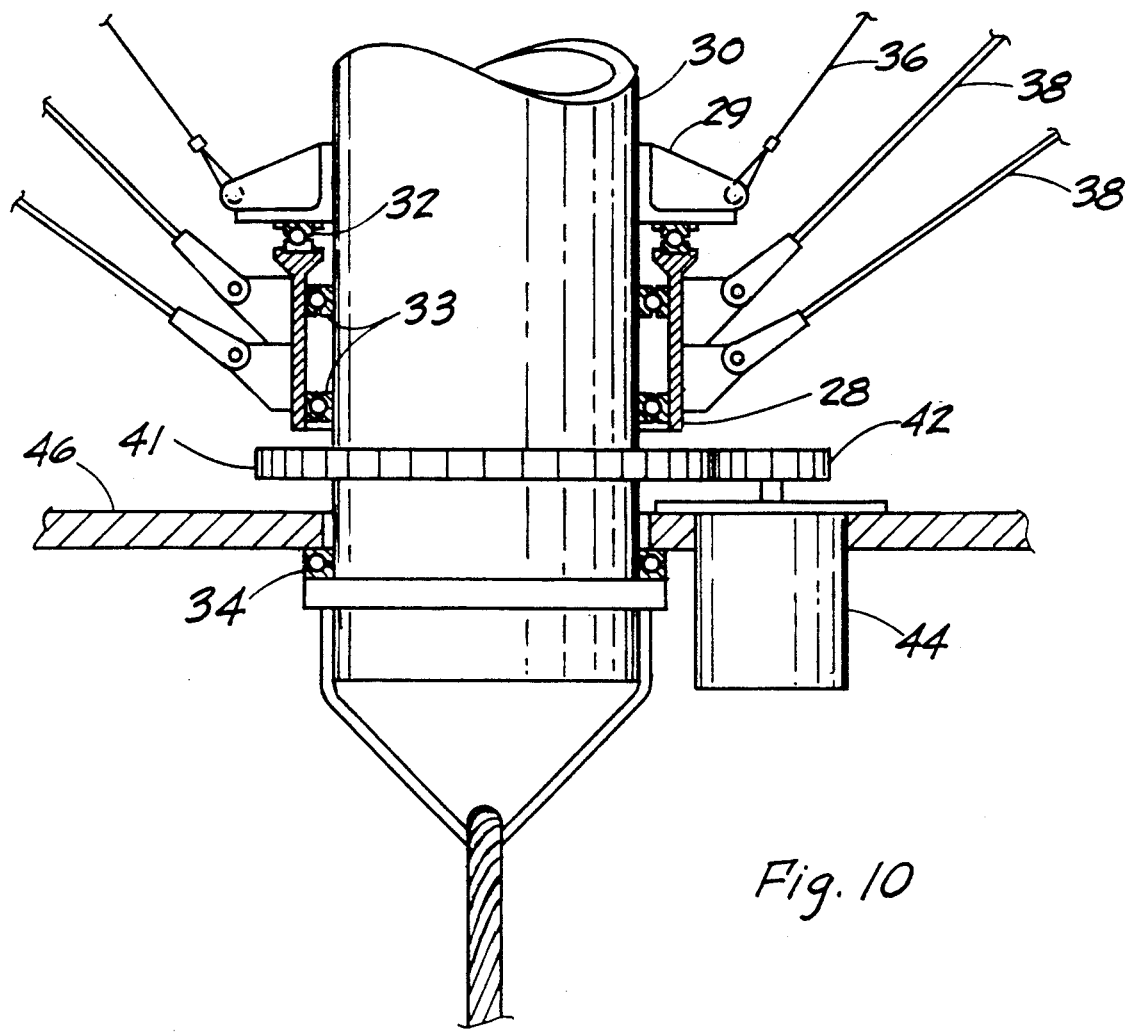
FIG. 10 is a fragmented view of the bottom axle with terminals for hull attachment cables and anti-torque device.
Figure 4:
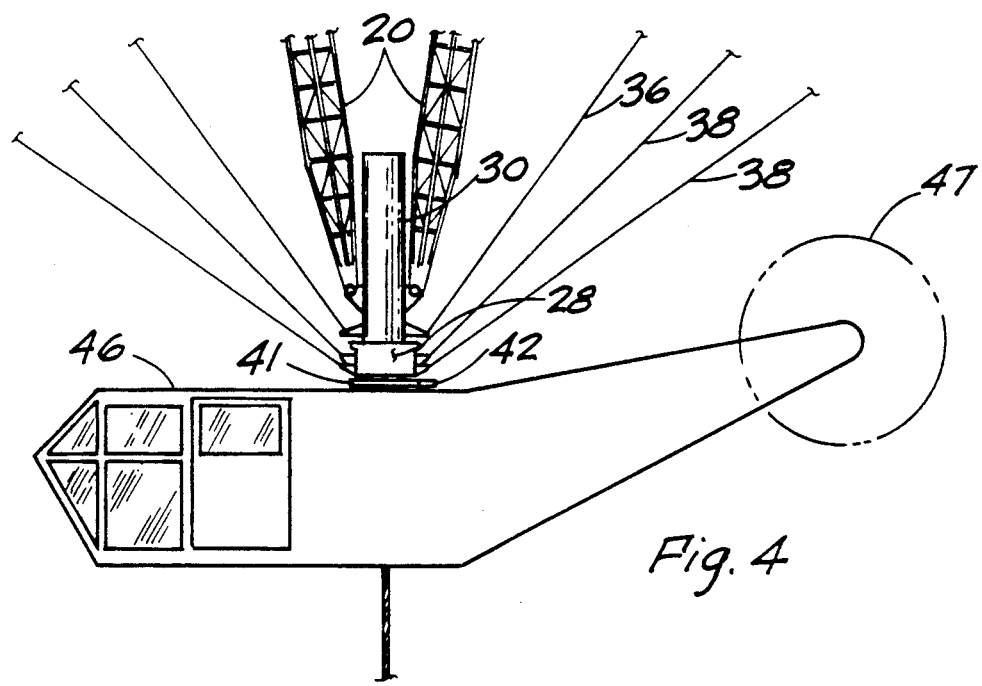
FIG. 4 is an enlarged side elevation of the aircraft with a vertical axis showing a portion of the vertical axis, control cab and tail rotor.

FIG. 4. shows the control cab 46 with the anti-torque propeller 47. The bottom axle 30 with terminals for the hull attachment cables 36 is connected to the support structure 20. The suspension cables 38 are connected to the bottom bearing housing 28. An alternate anti-torque means to keep the cab from rotating is show in Fig. 10. The motor 44 drives a spur gear 42 which interacts with the ring gear 41.

Figure 5:
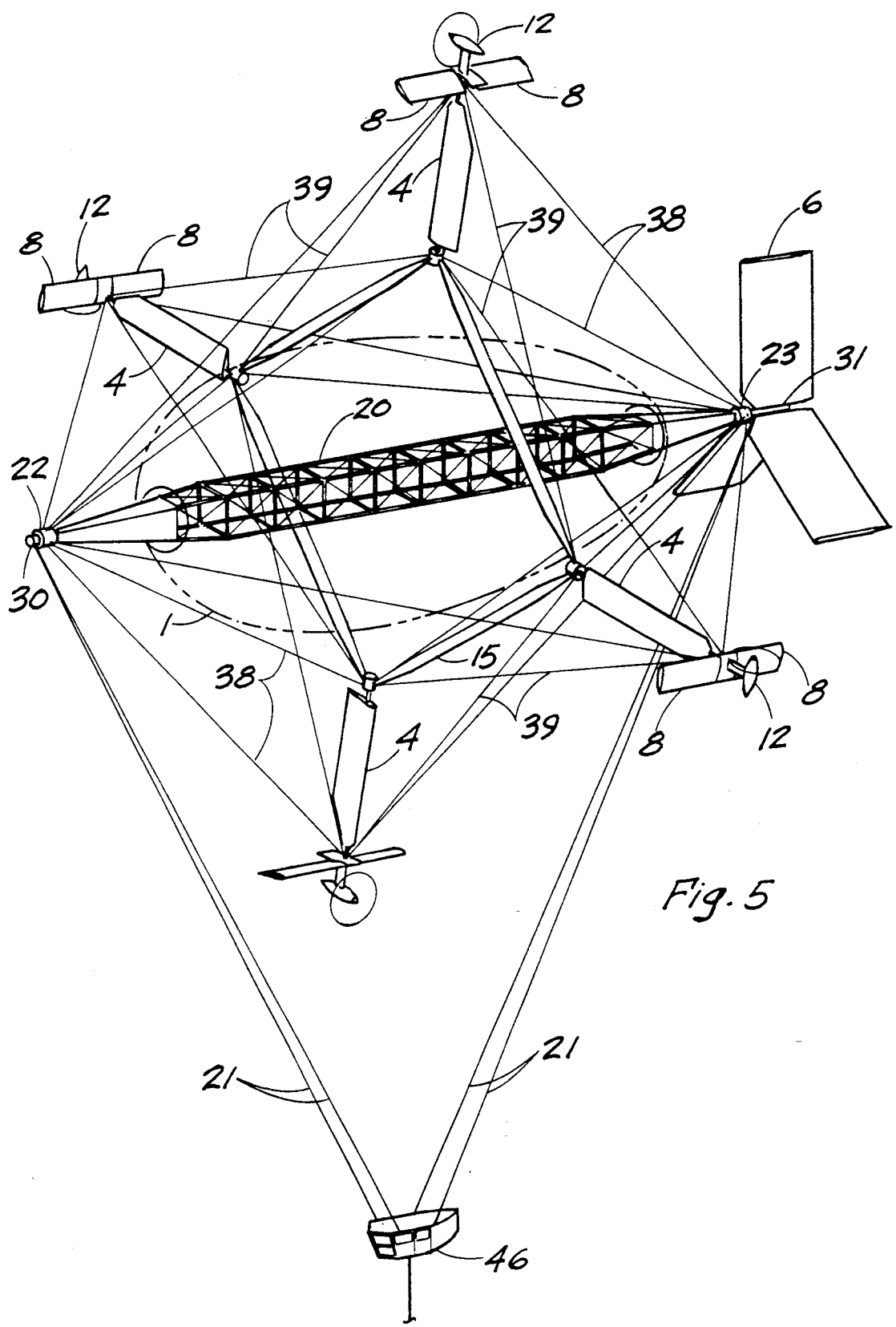
FIG. 5 is a pictorial view of the aircraft with a horizontal axis showing the gas containment chamber in phantom.
Figure 6:
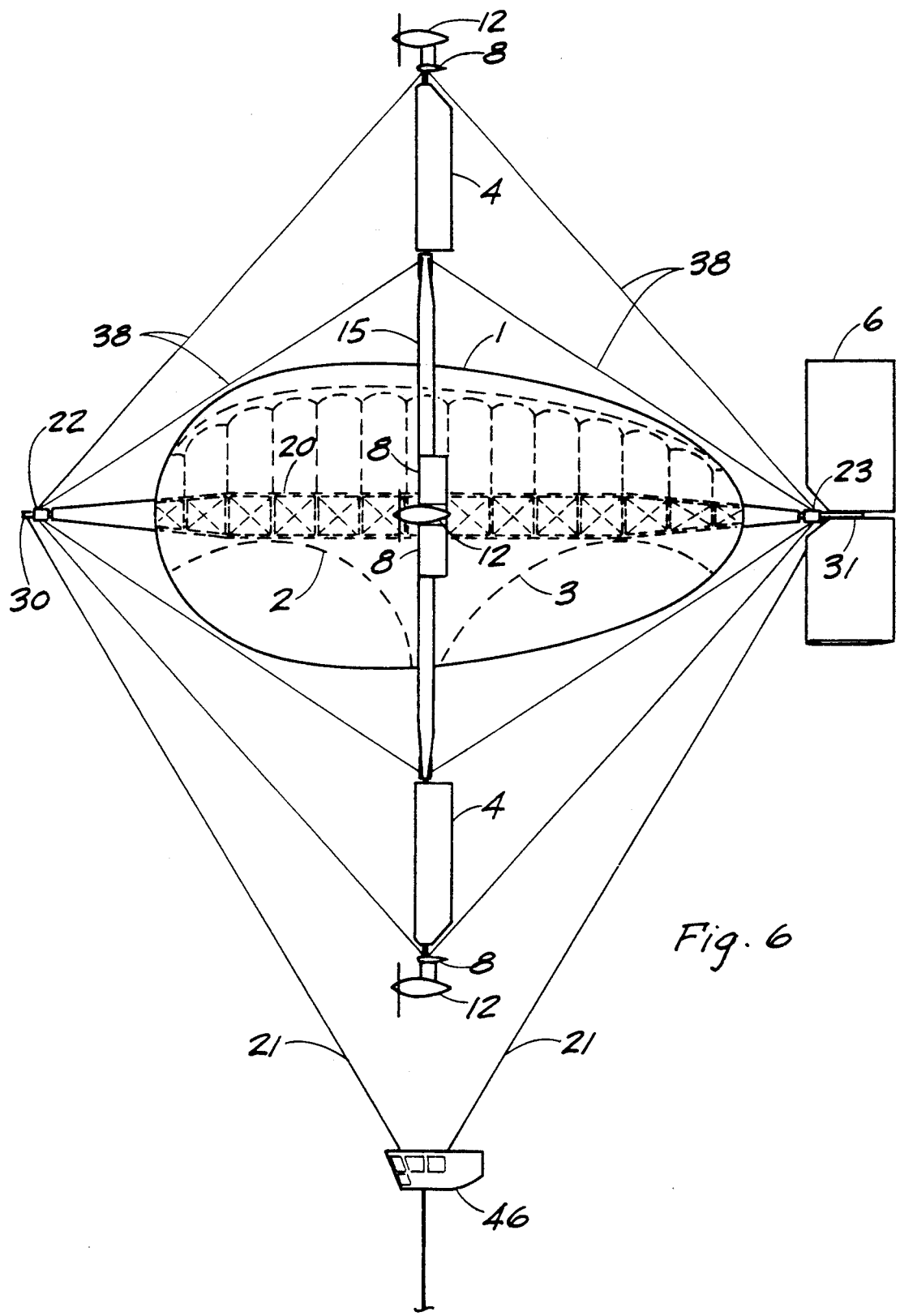
FIG. 6 is a side elevation of the aircraft with a horizontal axis.

FIG. 5 shows the aircraft with the support structure 20 in the horizontal position and the balloon chamber 1 surrounding it. The support structure 20 protrudes out of the balloon chamber 1. The rotor frame 15 encircles the balloon chamber 1. Attached to the rotor frame is blade airfoil 4. The angle of attack of the blade airfoil can be adjusted. At the end of the blade airfoil 4 the wing airfoil 8 is perpendicularly mounted. The angle of attack of the wing airfoil can be adjusted. A means of thrust 12 is mounted at or near the blade airfoil 4. The means of thrust causes the rotor frame 15 to rotate around the balloon chamber 1. The longitudinal brace cables connect to the forward bearing housing 22 and the aft bearing housing 23 and position the rotor frame 15. The peripheral brace cables 39 position the blade airfoils 4 in a radial direction from the balloon chamber 1. The tail assembly 6 is mounted to the aft axle 31. The control cab 46 is suspended by control cab suspension cables 21 which are attached to the forward axle 30 and the aft axle 31. FIG. 6 is a side elevation of the aircraft with a horizontal axis. The forward ballonet 2 and the aft ballonet 3 are shown within the balloon chamber 1. As is common in the art the intake fans and exhaust port are located along the bottom center line of the balloon chamber and allow for maintaining a constant pressure, and changing pressure if desired of the gas within the balloon chamber. The tail assemble 6 is affixed to the aft axle 31.

Fig.7, 7a, 8, 8a, 9, and 9a depict the wing airfoil and the blade airfoil in several different positions during flight. FIG. 7 shows the wing airfoil 8 with cyclic pitch. This is used for producing aerodynamic lift either positive or negative. The blade airfoil 4 is shown in trail or flat pitch. FIG. 7A shows the side view of the aircraft in FIG. 7. FIG. 8 shows the blade airfoils 4 collectively pitched to provide forward thrust. They may also be pitched to provide aft thrust. FIG. 8A shows the side view of the aircraft in FIG. 8. In FIG. 9 the rotor frame is in non-rotational mode. The horizontal blade airfoils 4 develop sufficient lift because of the forward velocity of the aircraft. FIG. 9A show the side view of the aircraft in FIG. 9. Desired directional changes are achieved by a mix of collective and cyclic pitch of the blade airfoils 4.

I claim:

1. I claim a hybrid aircraft comprising:
   a large non-rotating balloon chamber containing a lighter-than-air gas which provides a large static lifting force having a magnitude substantially greater than the weight of said aircraft;
   a support structure system which is substantially longer in length than in width which is encased by the balloon chamber said support structure system having two ends which protrude from the balloon chamber at opposite sides along the center line of the balloon chamber;
   a rotatable rotor frame which is suspended from the ends of the support structure system about the non-rotating balloon chamber;
   a plurality of blade airfoils connected to the rotor frame and oriented radially relative to said balloon chamber whereby the angle of attack of each blade airfoil can be varied;
   a thrust means mounted at or near the outboard end of the blade airfoils;
   a wing airfoil perpendicularly connected to the end of the blade airfoil at the same end as the thrust means whereby the angle of attack of each wing airfoil can be varied;
   a means of anti-torque;
   a control cab;
   a load line.

2. The device as claimed in claim 1 wherein the length of the support structure is substantially horizontal.

3. The device as claimed in claim 1 wherein the length of the support structure is substantially vertical and the means of anti-torque is a tail rotor attached to the control cab.

4. The device as claimed in claim 1 wherein the length of the support structure is substantially vertical and the means of anti-torque is a spur and ring gear driven with a motor.

* * * * *